J. H. TEUTEBERG.
NUT LOCK.
APPLICATION FILED JAN. 22, 1913.

1,100,794.                                         Patented June 23, 1914.

WITNESSES                                          INVENTOR

UNITED STATES PATENT OFFICE.

JOHN H. TEUTEBERG, OF MILAN, MISSOURI.

NUT-LOCK.

1,100,794.                Specification of Letters Patent.         Patented June 23, 1914.

Application filed January 22, 1913. Serial No. 743,571.

*To all whom it may concern:*

Be it known that I, JOHN H. TEUTEBERG, a citizen of the United States, residing at Milan, in the county of Sullivan and State of Missouri, have invented new and useful Improvements in Nut-Locks, of which the following is a specification.

My present invention relates to the class of nut and bolt locks and in the provision of a device of this character designed to prevent the rotation of a nut upon a bolt.

More particularly this invention provides an efficient and inexpensive device whereby nuts of different types may be held against reverse movement upon the bolt whether they be in engagement with the support or not.

My invention eliminates the use of frictional locking means, or in other words obviates the necessity of using a particular form of washer and nuts which aim to lock the latter in engagement with the supporting structure and prevent its rotation upon the bolt.

My invention further consists of a body portion having an upturned shoulder for engagement with one side of the nut, and in view of the fact that this body portion is prevented from rotating, it is apparent that the nut is also held in this particular position.

Often it is desired to screw a nut upon a bolt without tightening the same to any material extent, thus allowing the supporting structure or the bolt a little longitudinal movement. The majority of frictional locking devices do not allow this operation, but upon reference to the drawings wherein is disclosed my invention it is recognized that this can be done when using my invention, thus greatly adding to the efficiency of the device.

With the above and other objects in view my invention relates to such details of construction and in the arrangement and combination of parts as will be hereinafter fully described and specifically pointed out in the appended claims.

Figure 1:
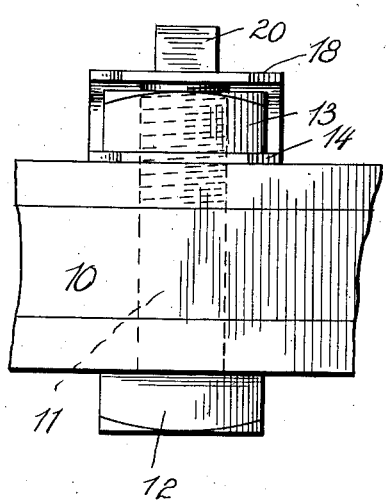
Figure 2:
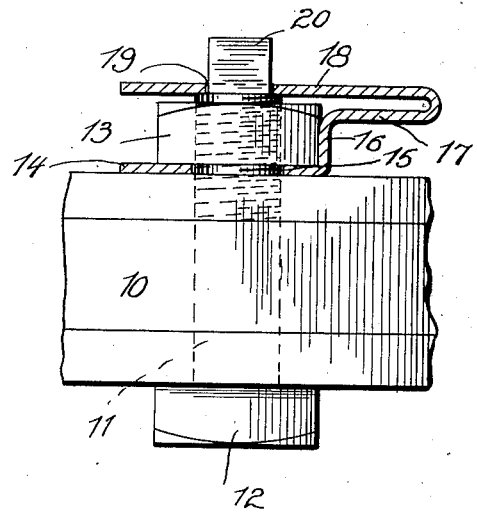
Figure 3:
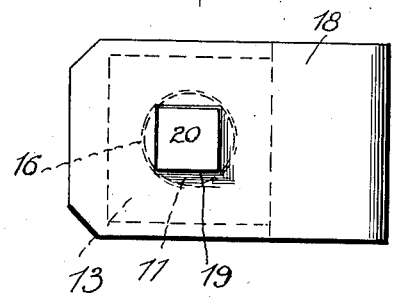

In describing my invention in detail, reference will be had to the accompanying drawings wherein like characters denote like or corresponding parts throughout the several views and in which;

Figure 1 is a front elevation of my invention showing the same disposed upon the bolt, the latter being in engagement with a suitable joist. Fig. 2 is a longitudinal sectional view of my invention illustrating the same at right-angles to Fig. 1. Fig. 3 is a plan view of the device shown in engagement with its engaging members.

Referring now more particularly to the drawings wherein is illustrated the preferred embodiment of my invention, the numeral 10 designates an ordinary beam or joist in connection with which the bolt 11 is shown. This is merely done to display the effectiveness of my invention and it is recognized that the beam may be eliminated if it is desired.

The bolt 11 is of the usual construction, carrying a head portion 12 at one end while a portion near its other end is screw threaded to receive the nut 13. In the usual frictional locking device, the nut is screwed upon the bolt until it engages the beam and is consequently forced so tightly thereagainst or against the washer that its reverse movement is eliminated. The nut will in time wear loose in this form and consequently I have provided a more efficient device as set forth.

My invention consists more essentially in a body portion 14 formed of sheet metal or the like, and provided with a central opening 15 for the reception of the bolt 11. The body portion is disposed upon the bolt beneath the nut, thus allowing the latter to be screwed down in engagement therewith. The nut does not necessarily have to be screwed until the body portion is forced into engagement with the beam, but on the other hand it may be disposed at the end of the bolt so that the same is free to move laterally within the beam.

After the nut has been screwed upon the bolt, one end of the body portion is bent upwardly to form a shoulder 16 which rests in engagement with one side of the nut, thus coupling the nut and the body portion together so that one can not rotate without the other. The shoulder 16 is again bent at its upper extremity to form a section 17, the latter being bent to form a parallel extending securing member 18. The securing member mentioned has a squared opening 19 provided therein, which opening receives such means as hereinafter mentioned.

The end of the bolt 11 beyond the screw threaded portion is constricted as shown and formed into a squared extension 20 which when in place receives the cut-out portion 19 in the securing member 18, thus preventing the rotation of the body portion independent of the bolt. Of course the securing member is forced over the extension 20 after the nut is screwed in place, consequently it is apparent that the nut is held against reverse movement and its operation presented without the use of any frictional locking means.

By the provision of the section 17, it is apparent that the fulcrum of the securing member is spaced a short distance from the nut, thus the arc of travel of the securing member is increased, consequently facilitating the reception of the extension in the cut-out portion 19. The section not only serves its purpose, but also provides a suitable handle portion by which the device may be manipulated when desired.

The greatest of stress is laid upon the simplicity of my invention, and it is thought that the advantages and novel features of the same will be recognized in the hereinbefore appearing disclosure.

Such changes as are permissible by the subjoined claims may be resorted to without departing from the spirit of my invention.

Having thus fully described my invention what I claim and desire to secure by Letters Patent is:

1. In a device of the character described, a body portion, an upstanding abutting shoulder formed integral therewith, an angularly extending section formed integral with said shoulder, and a spring-like securing member formed integral with said section by bending said section upon itself, as and for the purpose set forth and described.

2. In combination with a bolt having a reduced squared end and a nut operative thereon, of a body portion, an upstanding shoulder formed integral therewith, and engaging one side of said nut, a loop extending outwardly from said shoulder and formed integral therewith, and a securing member formed integral with said strand and engaging said squared portion, as and for the purpose set forth and described.

3. The combination with a bolt having a squared upper end and a nut threaded on said bolt, of a body portion formed of sheet metal and provided with an opening adjacent one end, said body portion disposed upon said bolt beneath said nut, a shoulder formed by bending said body portion upwardly at substantially right-angles, said shoulder bearing against said nut, an extension projecting from the upper end of said shoulder at substantially right-angles thereto, said extension constituting a handle, a securing member formed by bending said extension upon itself, said extension provided with a squared opening adjacent its upper end, said opening adapted for engagement with the squared end of said bolt, substantially as described and for the purpose set forth.

JOHN H. TEUTEBERG.

Witnesses:
JOHN S. POOLE,
C. P. SORRELL.

---

Copies of this patent may be obtained for five cents each, by addressing the "Commissioner of Patents, Washington, D. C."